United States Patent Office 3,705,217
Patented Dec. 5, 1972

3,705,217
PRODUCTION OF HALOETHYLPHOSPHONATE DIESTERS
Calvin Vogel, Easton, Pa., assignor to GAF Corporation, New York, N.Y.
No Drawing. Filed Oct. 17, 1969, Ser. No. 867,391
Int. Cl. C07f 9/40
U.S. Cl. 260—969       8 Claims

ABSTRACT OF THE DISCLOSURE 2-haloethylphosphonate diesters are prepared by the reaction of a vinyl or vinylene compound, a trialkyl or triaryl phosphite and halogen by reaction at a temperature of about 30 to 100° C.

BACKGROUND OF THE INVENTION

Field of the invention

This invention relates to a process for the preparation of 2-haloethylphosphonate diesters by the reaction of a vinyl or vinylene compound, a trialkyl or triaryl phosphite and halogen.

Description of the prior art 2-haloethylphosphonyl dihalides are products known in the art as being useful in various fields and particularly as intermediate products for various chemical synthesis such as, for example, the preparation of esters, amides and the like. Also, because of their phosphorus content, they have been found to be important in various applications as they have a fungicidal effect and can be used as pesticides or plant protective agents. In addition, the materials, because of their phosphorus content, are important additives in the preparation of difficultly inflammable polyesters. These 2-haloethylphosphonyl dihalides may be prepared by the reaction of the corresponding diesters, prepared by the process of this invention, with hydrogen halide. In addition, these 2-haloethylphosphonate diesters, which are the subject of this invention, are also useful in themselves as anti-inflammable additives for polyesters and other polymeric products. In addition the 2-haloethylphosphonate diesters are useful as intermediates for the preparation of the corresponding 2-haloethylphosphonic acids which compounds are in themselves useful as plant growth stimulants with the 2-chloroethylphosphonic acid being particularly useful in this regard.

A number of processes have been proposed for the preparation of these 2-haloethylphosphonate diesters but none have been particularly satisfactory in providing products of sufficient purity and high yield heretofore. Accordingly, the present invention satisfies this need of the art.

SUMMARY OF THE INVENTION

It is accordingly one object of this invention to provide a process for the preparation of diesters of 2-haloethylphosphonic acid in high purity and good yields.

A further object of the invention is to provide a procedure for the preparation of 2-haloethylphosphonate diesters by the reaction of a vinyl or vinylene compound, a phosphite and halogen.

A still further object of the invention is to provide a procedure for the preparation of 2-chloroethylphosphonate diesters by the reaction of a vinyl or vinylene compound, a trialkyl or triaryl phosphite and chlorine.

Other objects and advantages of the present invention will become apparent as the description thereof proceeds.

In satisfaction of the foregoing objects and advantages, there is provided by this invention a process for the preparation of diesters of 2-haloethylphosphonic acid by the reaction of a vinyl or vinylene compound, a trialkyl or triaryl phosphite and a halogen at a temperature of about 30 to 100° C.

DESCRIPTION OF PREFERRED EMBODIMENTS

As indicated above, this invention is concerned with a procedure whereby 2-haloethylphosphonate diesters are prepared by the reaction of a vinyl or vinylene compound, a trialkyl or triaryl phosphite and a halogen. This reaction may be described by the following equation.

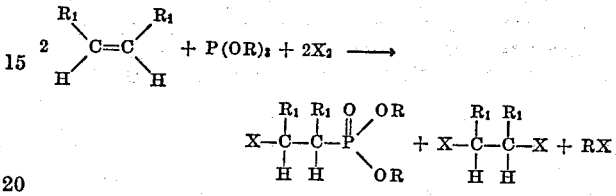

In the above equation R is an alkyl or aryl group, the alkyl group containing about 1 to 7 carbon atoms and the aryl group containing about 6 to 12 carbon atoms, with methyl and phenyl being especially preferred substituents, and $R_1$ is hydrogen, alkyl of 1 to 7 carbon atoms, cycloalkyl of 4 to 7 carbon atoms, aryl of 6 to 12 carbon atoms, $-CON(R_1)_2$, $-COOR_1$, $-OR_1$, $-HNCOR_1$, halo(chloro, bromo, etc.), $-OCOR_1$ and the like. With respect to the vinyl or vinylene compound, ethylene is of course, the desired reactant. In addition X is a halogen atom such as chlorine or bromine but is highly preferably chlorine as the most desired final product is the 2-chloroethyl derivative.

This reaction is preferably conducted by the simultaneous addition of the vinyl or vinylene compound and halogen to the phosphite reactant maintained in an inert solvent and preferably in a closed system. Particular solvents which may be employed are those which will dissolve the phosphite starting material including the halogenated hydrocarbons such as chloroform, carbon tetrachloride, methylene dichloride and mixtures thereof as well as any other solvent which is not reactive with the starting materials under the conditions of the reaction. Hence, solvents which may be employed include the aromatic hydrocarbons such as benzene, xylene and toluene, the halogenated aromatic hydrocarbons such as chlorobenzene, dichlorobenzene and the like. Mixtures of these solvents may also be employed.

The reaction is preferably conducted over a temperature ranging from between 30 to 100° C., and most preferably between 50 and 100° C. for best reaction conditions. The reaction may be conducted at atmospheric pressure such as 10 p.s.i.g. or at very low pressure but inasmuch as the halogen, preferably chlorine or bromine, and the vinyl or vinylene compound are usually added as liquids, as vapors or liquids or as gases, it is highly preferred to use equipment suitable for operation at pressures up to about 250 p.s.i.g.

The vinyl or vinylene compounds for reaction with the phosphite are those which contain a vinyl or vinylene moiety in the molecule and are of the following formula:

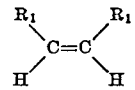

wherein $R_1$ is as defined above. The compounds of this class may be either of the cis or trans type or mixtures thereof. Compounds of this type which contain a vinyl or vinylene moiety are ethylene, propylene, butene-1, butene-2 (cis and trans), isobutylene, pentene-1, pentene-2 (cis and trans), hexene-1, hexene-2 (cis and trans), hexene-3 (cis and trans), cyclopentene, cyclohexene, vinyl cyclohexene, styrene, vinyl chloride, vinyl acetate, vinyl methyl ether, acrylic and methacrylic acid and esters or amides derived from same, acrylonitrile, vinyl amides and vinyl lactams, such as N-vinyl pyrrolidone, and the like. Obviously equivalent compounds of this class may also be used and these equivalent compounds are considered to be within the scope of the invention.

The phosphite reactant employed may be any of the phosphites well known in the art, especially the trialkyl or triaryl phosphites such as trimethyl phosphite, triethyl phosphite, triphenyl phosphite and the like.

In conducting the reaction a preferred procedure is to dissolve the required amount of the phosphite in the solvent, preferably in a reactor such as an autoclave, fitted with equipment which will permit the introduction of the vinyl or vinylene compound and the halogen simultaneously. Inasmuch as stoichiometric ratios of each material are necessary to insure completeness of the reaction, it is preferred to employ the reactants in approximate stoichiometric ratios.

Generally, during the addition of the halogen and the vinyl or vinylene compound, the temperature should be maintained within the range specified and the total reaction time will be found to be a period of several hours for a batch process.

The following examples are presented to illustrate the process of this invention but are not to be considered as limitative thereon.

EXAMPLE I

A 1-gallon stirred ceramic autoclave was charged with 124 grams (1.0 mole) of trimethyl phosphite and 250 ml. of carbon tetrachloride. The autoclave was fitted with two ports and chlorine gas was admitted through one port at a flow rate of 7.0 grams per hour. Simultaneously, ethylene, at a flow rate of 3.0 grams per hour, was introduced through the other port. The temperature was maintained at 50° to 60° C. and the total pressure never exceeded 250 p.s.i.g. Total reaction time was 15 hours. At the completion of the reaction the solvent and excess ethylene dichloride formed in the reaction were distilled off to provide 165 grams of liquid residue. Fractionation through a 2 foot Vigreaux column gave 25 grams of unreacted trimethyl phosphite boiling at 105–111° C. This residue was fractionated under reduced pressure (1.5 to 2.0 mm. pressure) into four fractions. Fractions 2 and 3 weighed 99 grams and were determined by infrared analysis to consist mainly of 2-chloroethylphosphonate dimethyl ester.

EXAMPLE II

The reaction of Example I was repeated except that the solvent was chloroform and the phosphite employed was triethyl phosphite. Employing the same reaction conditions and techniques there was obtained a similar yield of substantially pure 2-chloroethylphosphonate diethyl ester.

EXAMPLES III TO X

Examples III to X were carried out using stoichiometric ratios of the three reactants with the reactants and conditions specified in following Table I. The equipment and operation of the reaction were as in Example I. Table I also indicates the products produced in the reaction.

TABLE I

| Example number | Phosphite | Vinyl or vinylene compound | Halogen | Temp., °C. | Solvent | Product |
|---|---|---|---|---|---|---|
| III | $P(OC_2H_5)_3$ | Propylene | Chlorine | 55–60 | $CHCl_3$ | $Cl-CH_2CH(CH_3)-P(O)(OC_2H_5)_2$ |
| IV | $P(OC_6H_5)_3$ | Hexene-1 | do | 50–60 | $CCl_4$ | $Cl-CH_2CH(CH_2CH_2CH_2CH_3)-P(O)(OC_6H_5)_2$ |
| V | $P(OCH_3)_3$ | Cyclohexene | do | 55–60 | $C_6H_6$ | $Cl-CH-CH-P(O)(OCH_3)_2$ (cyclohexyl ring) |
| VI | $P(OC_2H_5)_3$ | Styrene | do | 50–60 | $CH_2Cl_2$ | $Cl-CH_2CH(C_6H_5)-P(O)(OC_2H_5)_2$ |
| VII | $P(OC_6H_5)_3$ | Vinyl acetate | Bromine | 55–60 | $CCl_4$ | $Br-CH_2CH(OCOCH_3)-P(O)(OC_6H_5)_2$ |
| VIII | $P(OCH_3)_3$ | Vinyl methyl ether | Chlorine | 50–55 | $CHCl_3$ | $Cl-CH_2CH(OCH_3)-P(O)(OCH_3)$ |
| IX | $P(OC_2H_5)_3$ | Acrylonitrile | do | 55–60 | $CCl_4$ | $Cl-CH_2CH(CN)-P(O)(OC_2H_5)_2$ |
| X | $P(OC_6H_5)_3$ | N-vinyl pyrrolidone | do | 50–60 | $CH_2Cl_2$ | $Cl-CH_2CH(N\text{-pyrrolidonyl})-P(O)(OC_6H_5)_2$ |

What is claimed is:
1. A process for the preparation of 2-haloalkanephosphonate diesters which comprises reacting in a closed system a compound containing a vinyl or vinylene moiety, a trialkyl or triaryl phosphite and a halogen at a temperature of about 30 to 100° C. under a pressure ranging from 10 to 250 p.s.i.g. in an inert solvent medium selected from the group consisting of halogenated aliphatic hydrocarbons, aromatic hydrocarbons, halogenated aromatic hydrocarbons and mixtures thereof.

2. A process according to claim 1 wherein the compound containing a vinyl or vinylene moiety has the following formula:

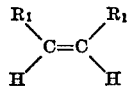

wherein $R_1$ is hydrogen, alkyl of 1 to 7 carbon atoms, cycloalkyl of 4 to 7 carbon atoms, aryl of 6 to 12 carbon atoms, $-CON(R_1)_2$, $-COOR_1$, $-OR_1$, $-NHCOR_1$, halo, or $-OCOR_1$.

3. A process according to claim 2 wherein the phosphite has the following formula:

$P(OR)_3$ wherein R is alkyl of 1 to 7 carbon atoms or aryl of 6 to 12 carbon atoms.

4. A process according to claim 3 wherein the halogen is chlorine.

5. A process according to claim 1 wherein the halogen and compound containing said vinyl or vinylene moiety are introduced simultaneously into the phosphite contained in a solvent.

6. A process according to claim 1 wherein the reactants are ethylene, trimethyl phosphite and chlorine, the reaction is conducted at 50° to 60° C. and the resulting product is 2-chloroethylphosphonate dimethyl ester.

7. A process according to claim 1 wherein said compound containing a vinyl or vinylene moiety is ethylene, said phosphite is trimethyl phosphite and said halogen is chlorine.

8. A process according to claim 7 wherein the chlorine and ethylene are introduced simultaneously into a solution of trimethyl phosphite in said inert solvent.

References Cited
UNITED STATES PATENTS 2,928,861   3/1960   Short _____ 260—969 X
2,078,582   4/1937   Nafash _____ 260—585 A LEWIS GOTTS, Primary Examiner R. L. RAYMOND, Assistant Examiner U.S. Cl. X.R.

260—326.5 J, 940, 950, 952, 958, 961